INVENTORS
EDWARD F. DE HAAN
PAULUS P.M. SCHAMPERS
JOHANNES H.N. VAN VUCHT
BY

AGENT

INVENTORS
EDWARD F. DE HAAN
PAULUS P.M. SCHAMPERS
JOHANNES H.N. VAN VUCHT
BY [signature]
AGENT INVENTORS
EDWARD F. DE HAAN
PAULUS P.M. SCHAMPERS
JOHANNES H.N. VAN VUCHT
BY
AGENT INVENTORS
EDWARD F. DE HAAN
PAULUS P.M. SCHAMPERS
BY JOHANNES H.N. VAN VUCHT
Frank R. Trifari
AGENT United States Patent Office 3,444,412

Patented May 13, 1969

3,444,412

PHOTO-RESPONSIVE DEVICE HAVING PHOTO-SENSITIVE PbO LAYER WITH PORTIONS OF DIFFERENT CONDUCTIVITY TYPES

Edward Fokko de Haan, Paulus Philippus Maria Schampers, and Johannes Hendrikus Nicolaas van Vucht, all of Emmasingel, Eindhoven, Netherlands Original application Mar. 10, 1964, Ser. No. 350,713, now Patent No. 3,372,056, dated Mar. 5, 1968. Divided and this application Oct. 18, 1967, Ser. No. 676,198

Claims priority, application Netherlands, Mar. 12, 1963, 290,119

Int. Cl. H01j *31/38*

U.S. Cl. 313—65 28 Claims

ABSTRACT OF THE DISCLOSURE

A photo-responsive device, in particular a television camera tube, employing a photo-sensitive PbO layer the major portion of which, at least 4$\mu$ in thickness in the direction of current flow, being intrinsically conductive, the layer also having a relatively thin portion of p-type conductivity adjoining a negative terminal connection.

This application is a division of application Ser. No. 350,713, filed Mar. 10, 1964 which is now U.S. Patent No. 3,372,056, granted Mar. 5, 1968.

Our invention relates to a photo-responsive device and method of making the same. More particularly, the invention relates to a device comprising a layer of photo-sensitive, for instance photo-conductive, material applied to a support by evaporation. The layer consists mainly of PbO containing impurities and/or deviations from the stoichiometry which render portions thereof n-type or p-type conductive. The device also includes means for supplying an electric current to the photo-sensitive layer.

In this connection, a material is considered to be photo-sensitive when one or more electrical properties of the material are capable of being reversibly changed by irradiation with suitably chosen electromagnetic or corpuscular radiation; and, in the case in which the electrical conductivity of such a material is subject to change by such radiation, the material is said to be photo-conductive.

In such photo-sensitive devices the layer of photo-sensitive material may be vapor-deposited on a surface of an insulating support, which is provided with one or more parallel, linear electrically interconnected metal electrodes constituting a terminal. A second current supply member, or terminal, for the photo-sensitive layer may then be formed by similar, electrically interconnected electrodes, also provided on the support or on the surface of the layer remote from the support. In either case, they may be vapor-deposited and alternate with the first-mentioned electrodes. Alternatively, the support may consist of a current-supply electrode for the photo-sensitive layer in the form of a continuous conducting substratum, in which case the current supply to the surface of the photo-sensitive layer remote from the support may also be performed by an uninterrupted, conducting layer. In the latter case the photo-sensitive layer with these two electrodes may constitute a photo-conductive cell with a sandwich structure when the layer has continuous electrodes applied thereto in which case one or both electrodes may have to be transparent to electromagnetic radiation. Instead of supplying the current by means of an electrode which is applied to the whole or part of the surface of the photo-sensitive layer remote from the support, the current may be supplied to this surface by means of electrons emanating from an electron gun arranged opposite said surface of the photo-sensitive layer.

The device, according to the invention, is preferably of the latter type in which case it may form a vidicon camera tube in which the target plate, vapor-deposited on a transparent signal electrode, is formed by a layer of photo-conductive material, of which the side remote from the signal electrode is to be scanned by an electron beam emanating from the electron gun of the tube.

For completeness sake, it should be noted that current may be supplied to the photo-sensitive layer of a device, as described, by means of electrodes provided only on the side of the layer remote from the support.

While the invention is about to be described in connection with a vidicon-type camera tube, it should be clearly understood, however, that the principles discussed in this connection are applicable to other types of devices employing a photo-sensitive layer. The invention is, therefore, not limited to a vidicon-type camera tube, but is defined with greater particularity in the claims following the specification.

It should be noted, for example, that it is not necessary to provide one or more electrodes, recognizable as such, of satisfactorily conducting metal for the current supply to the photo-sensitive layer. The photo-sensitive layer may, for example, constitute an electrical connection between various regions of a semi-conducting element serving as a support for the layer. It also should be noted that hereinafter in the description of the invention with particular reference to a device constituting a vidicon-type camera tube, in which the path of the electric current in the layer coincides with the direction of thickness of the photo-sensitive layer utilized in said device, reference is, for the sake of simplicity, often made to direction of thickness where direction of the current is intended. The considerations which refer to this direction of thickness may generally be applied to devices in which the current passes in the longitudinal direction of the layer, in which case, if we are in fact concerned with the direction of the path of the electric current, this direction of thickness finds its analogy in the longitudinal direction of the layer going from the positive current supply to the negative current supply or vice versa. Such an analogy applies, for example, to a device comprising a photo-sensitive layer provided with interlaced electrodes, the distance between the electrodes being great as compared with the thickness of the layer.

It is known that the photo-sensitive target plate of a camera tube of the vidicon-type must fulfill certain requirements in order for the tube to be suitable for practical use. The most important requirements are:

(1) A low dark current $i_d$; it may be said that with a voltage difference between the cathode and the signal electrode of 10 to 30 v., the dark current should not be more than $5\times10^{-9}$ a.;

(2) The capacity of the target plate should lie between given limits; with an excessively small capacity the signal current obtained with scanning is too low, and with an excessively large capacity the scanning beam is not capable of replenishing, at an image point, the charge leaking away by conduction within a frame period, i.e. of stabilizing the free surface of the target plate with a simple beam at cathode potential. A factor capable of affecting the capacity of the target plate is its thickness, because different absorptions of the material for radiations of different wavelengths the thickness of the target plate also affects the spectral sensitivity;

(3) A small time lag in photo-conductive response, i.e. the electrical conductivity of the target plate must follow satisfactorily rapidly variations in the exposure intensity;

(4) Sufficient lifetime; the tube must be capable of operating for a given number of hours before variations, particularly of the aforesaid properties occur to an extent such that the tube is no longer suitable for practical use for camera tubes for use in television studios. A lifetime of about 100 hours is, at present, considered to be acceptable; for industrial television in which the tube is usually operative for longer periods a lifetime of at least 1,000 hours is desired;

(5) An adeqaute sensitivity to the image radiation penetrating through the signal electrode to the target plate. For visible light usually at least about 150 $\mu$a. per lumen of light with a color temperature of 2,870° K. is desired. Moreover, the spectral sensitivity plays a role. For color television it is important to have a camera tube available which has a reasonable sensitivity in every part of the visible spectrum.

It is known that for camera tubes having a photo-sensitive target plate consisting of a polar substance, particularly lead monoxide (PbO), a low value of the dark current can be obtained by providing in the target plate one or more planar p-n-junctions extending parallel to the plane of the target plate, each junction being obtained by joining two zones of target plate material lying one after the other in the direction of thickness and being of opposite conductivity type. Preferably the target plate of this known tube is provided with a zone of p-conductive material on the side facing the electron gun, which zone joins, in the simplest case, a zone of n-type conductivity, in contact with the signal electrode. For a tube of this type with a target plate of lead monoxide, a zone of n-type conductivity material may be obtained by incorporating bismuth or antimony in the lead monoxide; whereas, a p-type conducting zone can be obtained by the incorporation of an excess quantity of oxygen or a metal, for example, silver into the lead monoxide.

We have found that the creation of a planar p-n-junction formed by adjacent zones of opposite conductivity type in a comparatively thin target plate, as commonly used in a vidicon camera tube, meets with technical difficulties, particularly with respect to its reproducibility. Moreover, such a target plate, because of the small thickness of the p-n-junction, usually has too high a capacity and a low sensitivity. This may be understood when it is realized that the electric field in the target plate produced by the potential difference between the free surface of the target plate which is stabilized at cathode potential and the signal electrode, will prevail mainly across the thin p-n-junction and that the further part of the thickness of the target plate will, for the major part, be field-free.

It is a principal object of our invention to provide a device employing a photo-sensitive layer which has a greatly improved response to radiation incident thereon.

A further object of our invention, in connection with a vidicon camera tube, is to provide such a tube having an improved target.

A still further object of our invention, in particular with respect to a vidicon camera tube, is to provide a target for such a tube in which the dark current is kept to a minimum value.

Another object of our invention, in particular with respect to a vidicon camera tube, is to provide a target for such a tube having a greatly improved spectral response, particularly in the red region of the spectrum.

A further object of our invention, particularly with respect to a vidicon camera tube, is to provide a target for such a tube which can follow rapid variations in exposure intensity.

A still further object of our invention, also with respect to a vidicon camera tube, is to provide a target for such a tube which has a lifetime sufficient for most purposes.

And yet another object of our invention also with respect to a vidicon camera tube, is to provide a target for such a tube which has a reasonable sensitivity in every part of the visible spectrum so that the camera tube may be employed to televise color images.

These and further object of the invention will appear as the specification progresses.

In accordance with the invention, we have found first that a satisfactory sensitivity and a suitable capacity for the photo-sensitive layer can be obtained if, during operation, the electrical field prevailing in the photo-sensitive layer extends over a large part of the path of the electric current in the part of the layer where the charge carriers released by the radiation furnish this current, and thus, is not restricted mainly to a small part of said path. Second, a relatively high speed response is obtained if the material of the photo-sensitive layer behaves mainly as an intrinsically or nearly intrinsically conductive material. Third, the dark current can be reduced by providing photo-sensitive material which is p-conductive at the location of the negative current terminal (supply of electrons from the outside and/or drainage of holes from the material).

Thus, in accordance with the invention, we have found that the aforesaid objects and conditions are met if the material of the photo-sensitive layer, in a device of the aforesaid kind, exhibits intrinsic or nearly intrinsic conductivity over a distance of at least about 4$\mu$ in the direction of the electric current in the layer. This distance may be split up into different closely adjacent sections. The intrinsically or nearly intrinsically conductive material also joins or terminates in distinctly p-type conducting photo-sensitive material at the location of the negative current terminal to the layer and extends in the direction of the electric current over a distance which is small as compared with the first mentioned distance over which the material of the layer is intrinsically or nearly intrinsically conductive material. Preferably, the distance measured in the direction of the electric current in the layer, over which the photo-sensitive material has intrinsic or nearly intrinsic conductivity, forms a major part, preferably more than 90%, of the distance between the location of a negative current terminal and source of positive current to the layer. This is almost always the case when the direction of the current in the layer extends in the longitudinal direction thereof and this may be the case when, for example with a camera tube of the vidicon type, the current passes in the direction of thickness of the layer. In the latter case, however, as is described in co-pending application Ser. No. 350,870, filed Mar. 10, 1964, now U.S. Patent 3,289,024, part of the photo-sensitive layer occupying a greater or lesser part of the overall thickness of the layer may have such a high p-type or n-type conductivity that this part is, in fact, only operative for the negative current supply or the positive current supply to the remaining part of the layer which, in fact, alone is effectively photo-sensitive. Such a high p- or n-type conductive part is then intended to operate as an optical filter which absorbs radiation of shorter wave-length to a greater extent than radiation of longer wave-length, so that the device exhibits a higher relative sensitivity to longer wave-lengths than for shorter wave-lengths with incident radiation passing through the said part of the layer operating as an electrode for the rest of the layer.

In a further aspect of the invention, the material of the photo-electrically conductive layer is more or less n-type conducting where it electrically contacts a positive electrode or terminal. This region of n-type conductivity is then restricted to the region immediately adjacent this positive electrode or terminal. Thus, in a vidicon type camera, in accordance with the invention, provided with a photo-sensitive layer comprising intrinsically or nearly intrinsically conductive material over the largest part of its thickness, the photo-sensitive material may exhibit n-type conductivity where it contacts the signal plate. The n-conductive character of the photo-sensitive material then is confined to only a small part of the thickness of the layer immediately adjacent the signal plate. Such n-type conductivity of the material contacting a positive electrode or current supply member is intended to restrict the injection of holes from the positive electrode into the photo-sensitive material, and accordingly is effective in obtaining a low dark current.

We have found that although vidicon type camera tubes embodying the invention attained many of the aforesaid objects, their lifetime could differ between individual tubes. Moreover, the speed of photo-conductor response left something to be desired. The deficiency in desired lifetime became manifest in that the initially sufficiently low dark current increased in the course of operation to a value such that an undesirably high level of the dark current was reached prematurely. Elaborate research carried out by us has led to the assumption that various factors, probably working together, are responsible for this phenomenon. Among these factors may be mentioned loss of oxygen from the surface of the photo-sensitive layer during operation and the influence of impurities introduced during the vapor-deposition process into the photo-sensitive layer which impurities occur in small, practically unavoidable and hence usually not reproducible quantities in the evaporation space, or on the support. It is presumed, in particular, that water vapor, which can, in practice, not be completely eliminated from the evaporation space, is such an impurity, which acts as an n-former when incorporated in the photo-sensitive material.

Regardless to what extent the non-reproducibility of the lifetime as found is indeed due to these factors, it is nevertheless a fact that we have found that an improved and reproducible lifetime can be obtained without incurring a slow speed of response if in accordance with a further aspect of the invention, the intrinsic or nearly intrinsic conductivity of the material of the photo-sensitive layer is obtained by providing, in the part of the layer concerned, a quantity of water distinctly in excess of the unavoidable quantity thereof as well as an excess quantity of oxygen capable of compensating or substantially compensating for that quantity of water. It is presumed that by intentionally incorporating an excessive quantity of water, which quantity considerably exceeds the small quantity of water which is unavoidable in practical manufacture and which is non-reproducible, and by compensating this comparatively high quantity of absorbed water by means of an additional quantity of incorporated oxygen, the speed of response is favorably affected. Moreover, the incorporation of additional oxygen in the layer postpones to a much later instant the appearance of detrimental effects of loss of oxygen during operation of the device.

It should be noted that in the foregoing, like hereinafter, reference is made to water absorbed in the photo-sensitive layer and to an additional quantity of oxygen. It cannot be said with certainty how this water and this oxygen are held in the layer. It is assumed that OH-ions, and certainly oxygen atoms, are incorporated in the photo-sensitive material, and therefore form part of the crystal lattice, and that probably part of the excess oxygen is absorbed at the surface of the crystals of the photo-sensitive material.

In accordance with a further feature of the invention, the distinctly p-type conductivity of the material at the area of the negative current supply may be obtained by incorporating in this material a smaller quantity of water and preferably a greater quantity of oxygen than in the adjacent material having the intrinsic or nearly intrinsic conductivity.

The invention will be more fully described with reference to the accompanying drawing in which.

Figure 3A:
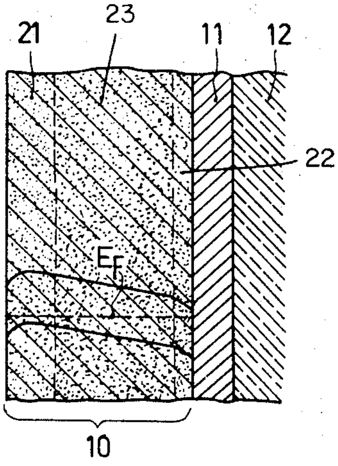
Figure 3B:
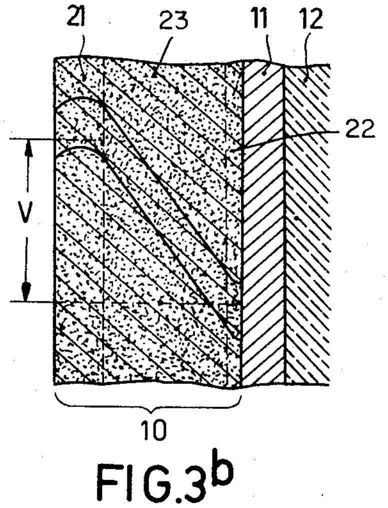
Figure 4:
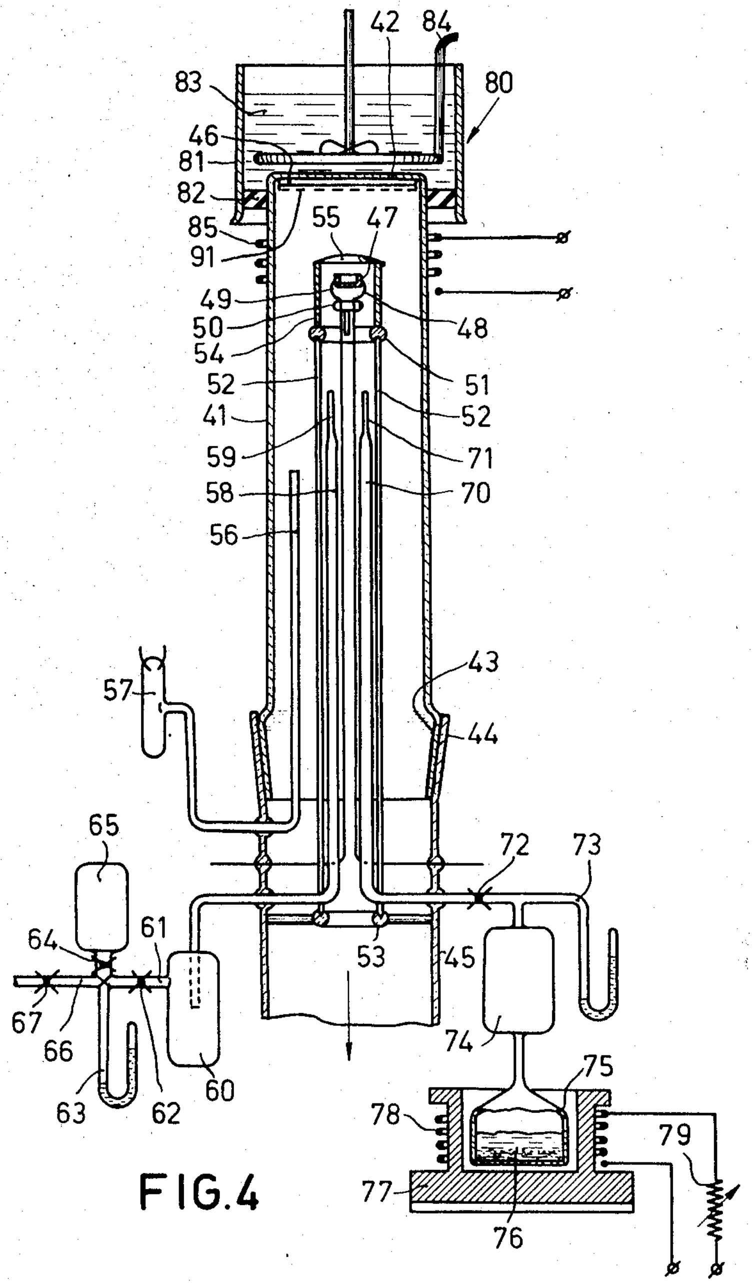
Figure 5:
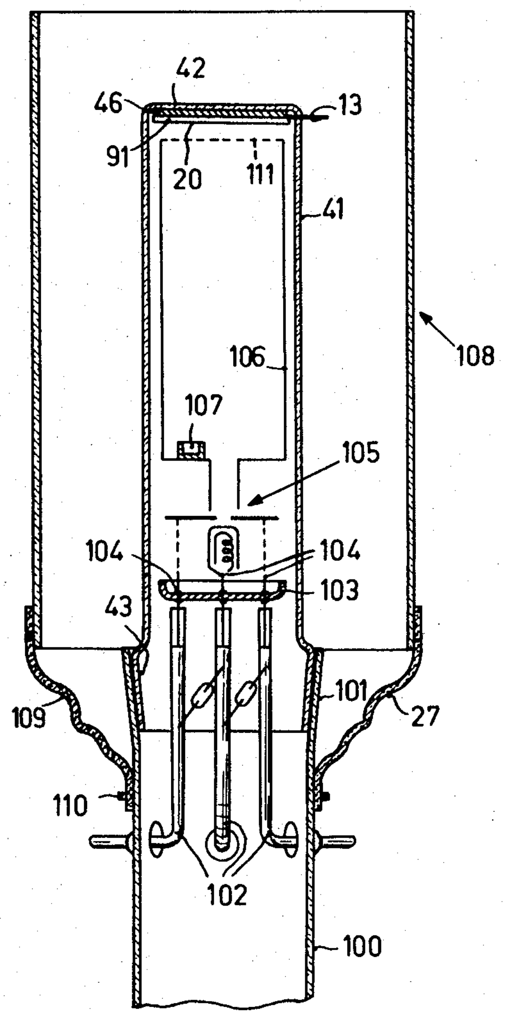
Figure 6:
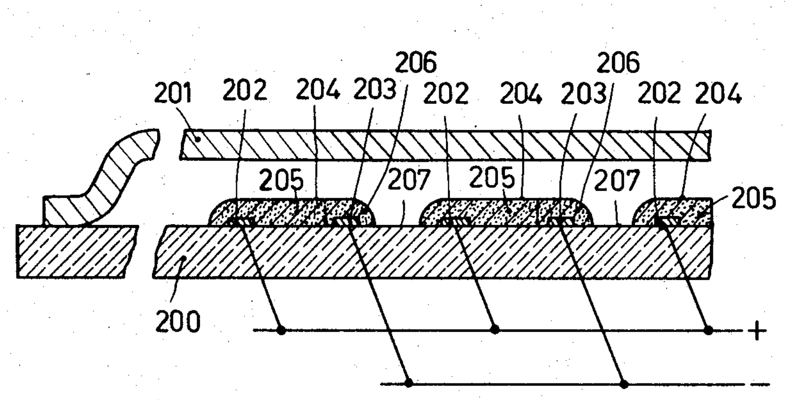

FIGS. 3*a* and 3*b* show diagrammatically the energy spectrum of the electrons across the thickness of this target plate without, and with, a voltage applied to the signal electrode during the operation of the tube;

FIGS. 4 and 5 illustrate embodiments of methods according to the invention for the manufacture of camera tubes; FIG. 4 shows a stage of the vapor-deposition process of the target plate material and the device to be used therefor; FIG. 5 shows a subsequent stage preceding the hermetic sealing of the camera tube;

FIG. 6 is a cross sectional view of part of a photo-conductive cell; and

Figure 7:
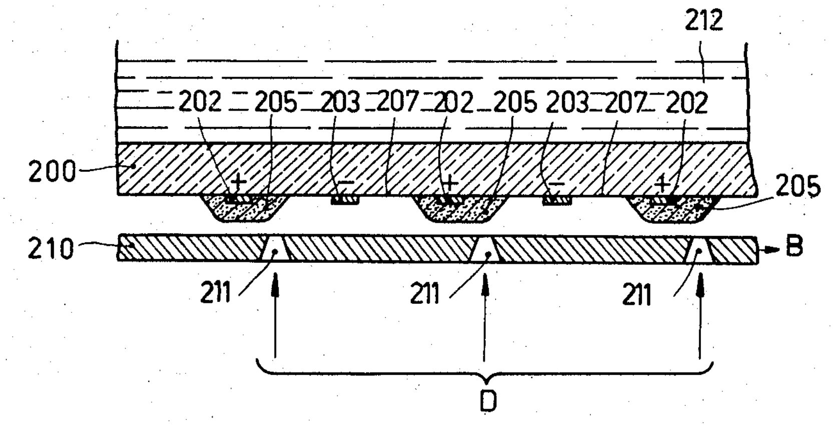

FIG. 7 shows a stage during manufacture of this cell.

Figure 1:
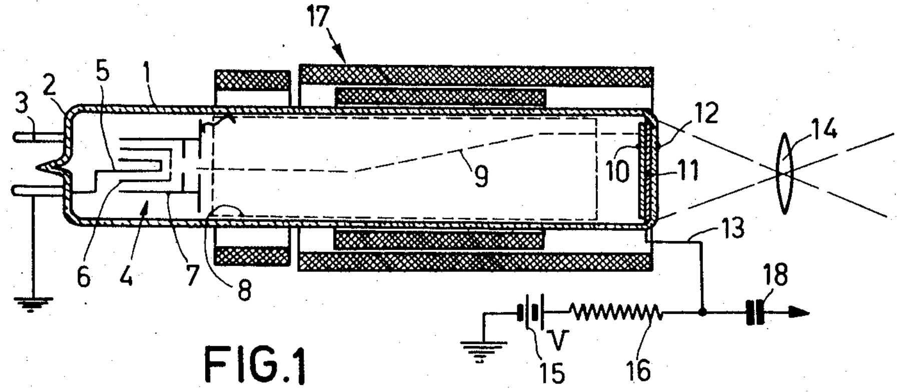
FIG. 1 shows diagrammatically a longitudinal sectional view of a camera tube embodying the invention.

The camera tube shown in FIG. 1 comprises an exhausted, elongated, cylindrical bulb 1 of glass, the left-hand end of which is closed by a glass base 2 through which connecting pins 3 extend. The connecting pins are connected to various parts of an electrode system 4, mounted in this end of the glass bulb 1. This electrode system, shown diagrammatically and comprising inter alia a cathode 5, a control-grid and a perforated anode 7, which is electrically connected to a wall electrode 8, is capable of producing an electron beam 9, for scanning a photo-sensitive target plate 10 at the other end of the bulb 1. The target plate 10 consists of a layer of lead monoxide (PbO) having a thickness of, for example 10 to 20$\mu$, and which was vapor-deposited on a transparent electrically conductive signal electrode 11, extending along the inner side of the window 12, formed by the right-hand end of the bulb 1. The signal electrode 11 may consist of a very thin layer of vapor-deposited metal, for example gold; it is more commonly formed by a thin layer of conductive tin oxide. A current supply conductor 13, taken through the wall of the bulb, is connected to signal electrode 11. It should be noted that the thickness of the target plate may exceed the value referred to above by way of example as 10 to 20$\mu$. Thus, with a tube, intended primarily for processing a picture formed by X-rays, a greater thickness, for example up to 200$\mu$, is advantageous. The target plate may be thicker for other reasons. For example, between a layer of photo-sensitive material corresponding to the lead monoxide layer applied to the signal electrode 10 to be described hereinafter with reference to the embodiment shown in FIGS. 1 to 3 and the signal electrode 11, an additional layer of similar photo-sensitive material exhibiting distinctly n-type conductivity may be sandwiched, this sandwiched layer operating as an optical filter and as a positive current terminal to the portion 10, constituting the effective target plate of this thicker lead monoxide layer.

In order to obtain electrical signals corresponding to a picture, which by means of an optical system represented in FIG. 1 by a lens 14, is projected through the window 12 and the signal electrode 11 onto the target plate 10 of the tube, suitable voltages are applied to the electrodes of the system 4, while by means of a voltage source 15, via a signal resistor 16, the signal electrode 11 receives a positive voltage V with respect to the cathode 5 of 10 to 100 v., for instance 30 v. By means of conventional deflection and focusing coils surrounding the tube (shown in FIG. 1 in common and designated by 17) the electron beam 9 is caused to move so as to scan the free surface of the target plate 10. During scanning this surface is stabilized each time at the potential of the cathode 5, while an electrical signal is produced, which can be derived through a capacitor 18 from the signal resistor 16.

Figure 2:
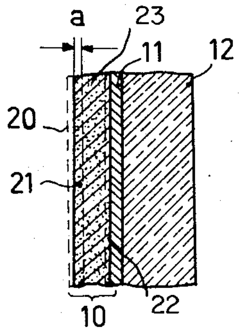
FIG. 2 shows part of the section of the target plate of this tube.

FIG. 2 shows, on an enlarged scale, part of the section of the target plate 10, the signal electrode 11 and the window 12 of the tube shown in FIG. 1. It should be noted that the thickness of the various parts are not shown in the correct ratio and are greatly exaggerated in size for the sake of clarity. The target plate 10 consisting mainly of lead monoxide may be provided on the free surface, that is the surface scanned by the electron beam 9, with an extremely thin layer of vapor-deposited metal 20, for example silver. This layer 20 has a thickness of about 100 A., so that it has substantially no electrical conductivity in the transverse direction. Such a metal layer 20 is, however, not required and may often be omitted, particularly when the surface of the target plate 10, as will be described hereinafter, has been exposed to an oxygen bombardment.

The target plate constituted by a layer of lead monoxide comprises a major portion 23 flanked on one side by a surface layer 21 of a thickness *a* and a thin zone 22 adjoining the signal electrode 11. In FIGS. 2, 3*a* and 3*b* the relative thickness of the target plate portions 21 and 22 is, for the sake of clarity, greatly exaggerated. In contrast to the lead monoxide of the thin portions 21 and 22, the lead monoxide of the major portion 23 exhibits the type of electrical conductivity which would be found in intrinsic, or nearly intrinsic lead monoxide. In the present instance this is the part 23 of the target plate. In reality, this part of the target plate does no consist of pure, intrinsic or nearly intrinsic lead monoxide, but of lead monoxide comprising intentionally a quantity of water exceeding the quantity thereof which in the deposition of the lead monoxide is in practice unavoidable. However, this intentionally incorporated quantity of excess water is compensated, or slightly overcompensated, by the simultaneous absorption of an adequate quantity of oxygen. The surface layer 21, however, consists of lead monoxide in which, by greater incorporation of excess oxygen and/or other suitable impurities, the influence of any water contained therein is overcompensated so that this surface layer is distinctly p-type conductive. The thickness *a* of the surface layer 21, as compared with the overall thickness of the target plate 10, is slight, here at the most 0.1 to 0.2$\mu$. The thickness *a* may be smaller if the lead monoxide of the surface layer 21 is more strongly p-type conductive. When this surface layer 21 is obtained, for example by bombardment with oxygen ions or high speed oxygen atoms, as described hereinafter, the layer 21 may have a thickness of not more than 10 to 200 A.

FIGS. 3*a* and 3*b* show the energy diagram of the electrons across the thickness of the target plate 10. FIG. 3*a* shows the same without potential difference, and FIG. 3*b* with a potential difference of V volts (signal electrode 11 at +volts relative to the cathode 5 of the tube) between the free surface of the target plate and the signal electrode 11. In FIG 3*a*, the Fermi level $E_F$ is indicated by a broken line. In the surface layer 21, where the lead monoxide is distinctly p-type conductive, a pronounced potential peak occurs. It is advantageous if at the side of the signal electrode 11, as is shown, a potential valley occurs. This is the case when the lead monoxide immediately adjacent the signal electrode 11, i.e. in the thin zone 22 exhibits n-type conductivity. This may occur automatically as a contact phenomenon, when the signal electrode 11 consists of conductive tin oxide, or another distinctly n-type conducting material, for example a metal such as lead, bismuth or antimony, which has an n-forming effect on the adjacent lead monoxide. Thus, with the exception of the boundary layers 21 and 22 of the target plate, that is the major portion 23, the lead monoxide in the target plate appears intrinsically or nearly intrinsically conductive, which requires that for, by far the major part of the target plate, the storing capacity for space charge is small. As is illustrated, particularly in FIG. 3*a*, the space charge in the intrinsic part 23, by which the potential jumps in the surface layers are compensated, extends substantially throughout this intrinsic part 23.

With a voltage of V volts between the free surface of the target plate and the signal electrode (FIG. 3*b*) substantially the whole intrinsically or nearly intrinsically conductive part 23 of the target plate takes this voltage as a result of this low storage capacity for space charge, while the electric field therein follows an approximately linear course. The height relative to the Fermi level of the potential peak in the surface layer 21 and also the depth of the potential valley directly adjacent the signal electrode then remains substantially unchanged, so that these surface layers take no voltage or only a small part of the voltage V. The potential peak at the free surface of the target plate therefore constitutes a barrier for the electrons absorbed by the target plate during the scan of the electron beam 9 and thus impedes a dark current formed by electrons. Conversely, the potential valley on the side of the signal electrode 11 constitutes a barrier for any holes tending to be injected into the target plate material from the signal electrode, so that in its entirety, this structure of the target plate ensures a low dark current, while the electric field produced by the voltage V across the target plate extends substantially throughout the thickness of the target plate. The latter provides a satisfactory sensitivity for image radiation which penetrates to a small depth as well as for radial ions which deeply penetrate into the target material, that is image radiation is absorbed, respectively, to a greater or to a lesser extent by the photo-sensitive material. On the other hand, the capacity of the target plate is, moreover, determined by substantially the whole thickness of the target plate, so that this capacity may have a really useful value.

Since the electric field in the target plate, due to the application of a voltage to the signal electrode 11, becomes manifest throughout the intrinsic or nearly intrinsic portion forming substantially the whole or by far the major portion of the target plate, substantially all charge carriers released from the target plate by incident radiation will produce an external current (that is in the circuit from signal electrode, via cathode to scanning beam). Consequently, in the example described, the whole target plate 10 may be considered to be "effectively operative." This need not always be the case, since the target plate may be formed by a layer of lead monoxide vapor-deposited on the signal electrode, said layer consisting, from the electrical point of view, of two different portions lying one after the other in the direction of thickness, i.e., a first portion on the side facing the electron gun and corresponding completely to the target plate 10 described above with reference to FIGS. 1 to 3 and a second portion between said first portion and the signal electrode and consisting of strongly n-type conducting lead monoxide which has consequently a relatively high electrical conductivity. Such a second portion with relatively high n-type conductivity may be obtained by incorporating, without compensation by oxygen in the lead monoxide in the deposition phase, a relatively large quantity of water or other impurity, giving rise to n-type conductivity, or a metal such as bismuth, or by depositing the lead monoxide of this portion with a deficincy of oxygen, i.e., a deviation from the stoichiometry. The first mentioned portion corresponding to the target plate 10 constitutes the effectively operating portion of this, by its nature, thicker target plate, whereas the second, comparatively good conducting portion constitutes an optical filter and provides, at the same time, the positive current supply to the first mentioned portion, as described in application Ser. No. 350,870, filed Mar. 10, 1964, now U.S. Patent 3,289,024.

A photo-sensitive device using lead monoxide exclusively as a photo-sensitive material exhibits a comparatively low sensitivity to red light. An improvement therein is obtained by providing, in accordance with the invention, in the effectively operating portion of the photo-sensitive layer a comparatively small quantity of sulphur, selenium and/or tellurium. Presumably, there are then formed mixed crystals of lead monoxide and lead sulphide, selenide and/or telluride. This absorption of sulphur, selenium or tellurium in the photo-sensitive layer consisting mainly of lead monoxide, for example in the target plate 10 described above, may be achieved for example by using hydrogen sulfide, seleniated hydrogen and/or tellurated hydrogen in the vapor-deposition of the target plate in a manner to be described more fully hereinafter.

The electrical structure of the effectively operating portion of the photo-sensitive target plate of the examples described above may be termed p-i-n, wherein the i-region has a total thickness of at least 4 microns and constitutes by far the major part of the path of the electric current in this effectively operating portion. It is not necessary for the lead monoxide of intrinsic or nearly intrinsic conductivity type to be confined to a single region of appropriate extension in the direction of the electric current flow, that is in this case the direction of thickness of the target plate. In general, the effectively operating portion of the photo-sensitive layer of the device, according to the invention, should have one or more thin p-type conducting regions. At least one such p-type region should be located at the area of the negative current supply to the layer. The layer should also have one or more i-regions, which taken together constitute the major part of the path of the electric current in the effective operating portion. There may be n-regions in the layer but these must not be considered to form part of the effective operating portion of the photo-sensitive layer, if they have dimensions in the direction of the path of the current that cannot be neglected. The effective portion of the photo-sensitive layer may have, going from the location of the negative current supply to that of the positive current supply, an electrical structure which can be characterized as p-i-p-i-n or p-i-n-p-i-n, the latter being a bivalent form of the structure of the target plate 10 described above. As a matter of course, a more than double structure is also possible.

FIGS. 4 and 5 serve to illustrate the manner in which a tube according to the invention can be manufactured.

In this method as well as those described in the parent application a target plate consisting mainly of lead monoxide is vapor-deposited on the window of a cylindrical part of a camera tube having a glass bulb (FIG 4), this window being provided with a signal electrode. This bulb is subsequently moved to a different pump system, which prior to that movement has been provided with a glass base which is sealed to the bulb and supports the electrode system to be mounted in the tube (FIG. 5).

In this method a long cylindrical glass bulb 41, having a flat window 42, is provided at the open end with a ground cylindrical member 43, by means of which it can be arranged in a vacuum-tight manner in a ground fitting member 44 at the end of a duct 45 communicating with a vacuum pump (not shown). A signal electrode of the camera tube to be manufactured formed by a transparent electrode 46 of conductive tin oxide was provided on the inner side of window 42. At a distance of about 40 mms. beneath the electrode 46, a platinum evaporation crucible 47 was arranged in bulb 41 which crucible was supported by two current supply conductors 48 and 49 of different metals, for example platinum and a platinum-rhodium alloy. These conductors are embedded in a bridge piece 50, which is supported by a glass supporting ring 51 inside the bulb 41. This supporting ring is supported by a pair of rigid stay wires 52, which are secured in a ring 53, mounted inside the duct 45. The conductors 48 and 49 extend in an axial direction through the bulb 41 in downward direction and are taken separately through the wall of the duct 45. On the flat ground upper rim of the supporting ring 51 a glass cylinder 54 was disposed surrounding the evaporation crucible 47, which cylinder can be closed by a moveable valve or lid 55 of magnetic material, preferably nickel, which is shown diagrammatically.

Through the wall of the duct 45 three glass tubes extend into the bulb 41 upwardly to approximately half the height thereof. The first tube 56 communicates outside the duct 45 with a vacuum meter 57, for example a Pirani-manometer. A second tube 58 terminates inside the bulb 41 in a capillary tube 59 and communicates outside the duct 45 via a vapor trap 60, which may be cooled by liquid air, with a duct 61 having a cock 62. This duct 61 communicates beyond the cock 62 with a manometer 63 and through a cock 64 with a container 65 containing oxygen and furthermore with a duct 66, which is closed by a cock 67. The third tube 70, which terminates inside the bulb 41 in a capillary tube 71, communicates through the duct 45 beyond a cock 72 with a manometer 73 and a vessel 74, serving as a buffer, which communicates with a vessel 75 containing a saturated aqueous solution 76 of lithium chloride. The vessel 75 is surrounded by a body 77 of satisfactorily thermally conducting material, for example copper. The body 77 is provided with a heating winding 78, which is connected via a variable resistor 79 to an electrical supply source. Instead of communicating with the vessel 75 containing lithium chloride solution, the buffer vessel 74 may communicate, if desired via a control-cock, with a different kind of container. The buffer vessel 74 may communicate furthermore, also through a control-cock, with a container containing instead of water, hydrogen sulfide, seleniated-hydrogen or tellurated-hydrogen or a mixture of two or more of these gases. The upper portion of the bulb 41 with the window 42 is surrounded by a bath 80 consisting of a cylindrical sheath 81, having at the bottom a rubber stuffing ring 82. The sheath 81 contains a liquid 83, for example glycerine or silicone oil, which can be brought by means of a heating helix 84 to a predetermined temperature and be held there. The bulb 41 is surrounded at the level of the evaporation crucible 47 by a high-frequency heating coil 85, which may be connected to a high-frequency generator (not shown). By inductively heating a quantity of lead monoxide in the crucible 47 it can be vapor-deposited onto the window of the bulb 41. Before the disposition of lead monoxide in the trough 47, the bulb and all members contained therein may be degassed by heat by means of a furnace positioned for that purpose around the bulb 41, while the bulb is exhausted.

400 to 600 mgs. of pure lead monoxide (PbO) were disposed in the evaporation crucible 47, the quantity being higher, if the pressure of the gas atmosphere in the bulb is higher, indicated hereinafter, at the beginning of the vapor-deposition process. The indicated quantity of lead monoxide is intended for a target plate of a diameter of about 3 cms. and a thickness of about 15 to 20$\mu$. For a target plate of greater thickness a correspondingly greater quantity of lead monoxide must be disposed in the crucible 47. This lead monoxide may, if necessary, have been evaporated previously and deposited in vacuum for purifying it. After the bulb 41 had been positioned on the duct 45, the coil 85 and the bath 80 were installed. The vacuum pump communicating with the duct 45 was actuated and in the meantime the heating winding 83 heated the bath 80 surrounding the window 42 to a temperature between 60° C. and 190° C., preferably about 120° C. Also the body 77 surrounding the vessel 75 containing the saturated lithium chloride solution was then heated in order to obtain a given water vapor pressure, for example about 12 mms. Hg in the buffer vessel 74.

After verification by means of the vacuum meter 57 that bulb 41 was, indeed, satisfactorily exhausted, oxygen was introduced into the bulb through the duct 45 by setting the cocks 64 and 61, while pumping was continued so that a constant pressure of the oxygen in the bulb was maintained, which pressure was at least $150\times10^{-5}$ mm. Hg, preferably $800\times1{,}000\times10^{-5}$ mm. Hg.

By setting the cock 72 and by adjusting, if necessary, the temperature of the vessel 75, water vapor was introduced into the bulb 41. Of course, a different kind of container of water vapor may be used instead of the vessel 74, 75 with the saturated lithium chloride solution for introducing water vapor via the cock 72 into the bulb 41. The introduction of water vapor was controlled so that the water vapor amounted to at least 20% and at the most to 80% of the total pressure in the bulb resulting from the admission of both oxygen and water vapor; this percentage is lower, the higher the previously adjusted oxygen pressure is. With an oxygen pressure of 800 to $1{,}000\times10^{-5}$ mm. Hg, the water vapor supply to the bulb 41 is preferably controlled so that a total pressure of about 1,100 to 1,300×$10^{-5}$ mm. Hg is attained.

By energizing the high-frequency heating coil 85 the evaporation crucible 47 was heated so that the lead monoxide melted and was then brought at a temperature at which this quantity of lead monoxide was evaporated in about 3 to 4 minutes, preferably in 180 to 200 seconds, that temperature having been previously determined experimentally by means of prior charges of the crucible 47 with the same quantity of lead monoxide. The temperature of the crucible 47 may be indicated by supporting wires 48 and 49, operating as a thermal element. As soon as the crucible had reached the desired evaporation temperature of the lead monoxide, the lid 55 which up to now closed the crucible 47 was lifted by means of a magnet arranged outside the tube (not shown), so that the lead monoxide could travel from the crucible 47 to the signal electrode 46. However, before the whole quantity of lead monoxide had evaporated, the supply of water vapor to the bulb 41 was reduced or blocked, for example by means of the cock 72, so that during the last stage of the vapor-deposition process the pressure of the water vapor in the bulb 41 decreases. The decrease should be such that, when the last part of the target plate has been deposited, there should be substantially no longer any water vapor present, which means in this case that the water vapor pressure in the bulb 41 should not exceed 2×$10^{-5}$ mm. Hg and preferably should be lower. It also depends upon the pumping speed of the vacuum pump connected to the duct 45, at which instant after the beginning of the vapor-deposition, and to what extent the introduction of water vapor to the bulb 41 should be reduced. It has been found that a satisfactory target plate in the bulb 41 was formed, when the reduction of the water vapor pressure in the bulb started about 45 seconds after the start of the vapor-deposition, i.e., the lifting of the lid 55.

It is important that during the vapor deposition process of the lead monoxide from the crucible 47 onto the window of the bulb 41 that the window be held at a temperature of not less than 60° C. and not higher than 190° C. At a tempearture of less than 60° C. the deposited layer may assume a glassy structure, so that it is fairly transparent, which results in the sensitivity to visible image radiation being low. At a temperature exceeding about 190° C. the lead monoxide is deposited in comparatively large crystals of dimensions approximately equal to the thickness of the target plate. In the operation of the tube this produces a visible structure in the picture, while the risk of appearance of the above-mentioned "white spots" is greater. Therefore, during the vapor-deposition of the target plate the window is preferably held at a temperature lying between the aforesaid limits, for example at a substantially constant temperature of about 120° C.

After the whole quantity of lead monoxide had evaporated from the crucible 47, the high-frequency heating coil 85 was switched off and the bath 80 and the coil 85 were removed. In the next phase the lead-monoxide layer or target plate vapor-deposited onto the window as above described and indicated in FIG. 5 by 91 may be provided with a p-type conductive surface by one of two methods now to be described.

In the first of these methods the layer 91 is subjected to a bombardment of oxygen ions carried out by means of a gas discharge in an oxygen atmosphere between the target plate 91 and an electrode disposed opposite the target plate at a given distance threfrom. Their gas discharge process may be performed with the crucible 47 serving as the electrode opposite the target plate. If the bulb 41 is filled with oxygen of a pressure of about 5,000×$10^{-5}$ mm. Hg, favorable results are obtained with a current intensity in the target plate of about 8 $\mu$a. per cm.$^2$ (that is a total current of about 60 $\mu$a. for a target plate having a diameter of 3 cms.) for a period of 10 to 60 sec. In order to cause the gas discharge current to pass through the target plate, it will usually be necessary to illuminate this plate. The light of the gas discharge itself may contribute to sufficiently reduce the resistance of the target plate. The gas discharge may be produced, with the aforesaid oxygen pressure and with a distance between the evaporation crucible 47 and the target plate of about 40 mms. in the aforesaid arrangement, by a direct voltage sources of about 1,000 v. in series with a series resistor having a value of about 6 mohms. It is the negative terminal of this source that is preferably connected to the signal electrode 46.

Of course, the gas discharge can be performed without using the arrangement shown in FIG. 4. For such purpose the bulb 41 with the deposited target plate may first be transferred, while using a protective gas, for example nitrogen to a further pump system provided with an electrode adapted to be temporarily positioned opposite the target plate. The gas discharge need not necessarily be supplied by direct-current voltage; alternating-current voltages may yield similarly favorable results. The gas discharge may be intensified or obtained solely by means of a high-frequency coil surrounding the bulb 41. The oxygen bombardment of the free surface of the target plate may also be performed subsequent to the transfer of the bulb to the pump system of FIG. 5. In that case the electrode gauze 111, closing the anode cylinder 106, may be used as one of the electrodes for the gas discharge.

A different method for obtaining a p-type conductive surface of the target plate 91 is the following.

After the vapor deposition of the target plate 91 as above described, the high frequency heating coil 85 was switched off and the oxygen supply to the bulb 41 was stopped by closing the cock 62. Moreover, the bath 80 and the coil 85 were removed from the window 42. Then, the bulb was exhausted and filled with nitrogen at atmospheric pressure, whereafter the bulb 41 was lifted into an upright position to a sufficient extent to introduce a new quantity of lead monoxide into the trough 47. This second charge of the crucible was considerably smaller than the first charge, for example 10 to 40 mgs. It consisted, moreover, of lead monoxide with an addition of thallium oxide ($Tl_2O$). This addition may be a few percent by weight, preferably 3% by weight. The lid 55 was replaced in its position in which it covered the crucible 47 and the bulb 41 was lowered onto the end of the duct 45. The coil 85 and the bath 80 were replaced in their initial positions and the window 42 of the bulb was again heated to about 120° C. and held at this temperature. The bulb 41 was exhausted to the optimum vacuum via the duct 45 after which via the capillary 49 oxygen was introduced to an extent such that the pressure in the bulb was about 1,000×$10^{-5}$ mm. Hg. In this stage of the manufacture of the camera tube water vapor was no longer introduced into the bulb. By energizing the coil 85, the contents of the crucible 47 were melted. By lifting the lid 55 with a magnet lead oxide with a proportional quantity of thallium was vapor-deposited onto the layer of lead monoxide previously applied to the window of the bulb. The vapor-deposition was terminated when a layer of a thickness of about a few hundred A. of thallium-doped lead monoxide had been applied to the portion of the target plate previously deposited. If a slightly excessive quantity of thallium-doped lead monoxide had been introduced into the crucible 47, this vapor-deposition could have been readily terminated by removing the magnet which holds the lid 55 opened, or alternately, by switching off the coil 85 in due time or by introducing, at the correct instant, such a quantity of oxygen into the bulb 41 that the pressure in the bulb rises rapidly to a value of about 3,000×$10^{-5}$ mm. Hg so that lead monoxide no longer is evaporated from the crucible 47.

Instead of thallium oxide, a compound of a different element operating for the lead monoxide as a p-former, or such an element itself may be added to the lead monoxide in the crucible 47 for completing the vapor-deposition of the target plate. For example silver, copper, silicon dioxide, lead fluoride may be added to the lead monoxide. However, in view of obtaining the longest lifetime possible, thallium oxide is preferred.

After the lead monoxide from the crucible 47 had been deposited on the inner side of the window 42 carrying the signal electrode 46 and the target plate 91 thus formed had been processed further, as the case may be, and after the communication of the duct 45 with the vacuum pump (not shown) had been closed, the bulb 41 and the communicating part of the duct 45 was gradually filled with an inert protective gas until the pressure inside and outside the bulb was the same. This inert protective gas filling of the bulb 41 serves to protect the vapor-deposited target plate 91 on the signal electrode 46 from atmospheric influence during the transition of the bulb 41 to a further pump system shown in FIG. 5, where the electrode system with the electron gun was mounted in the bulb. This further pump system comprises a duct 100, which communicates with a vacuum pump (not shown) and the open upper end of which is formed by a ground member 101 in which the ground member 43 at the bottom of the bulb 41 fits. Through the wall of the duct 100 are taken separately a number of rigid current conveying wires 102, which extend upwardly inside the duct 100 and terminate at the level of the ground member 101. These ends of the current wires 102 are hollow and adapted to accommodate the lower ends of a number of connecting pins 104, ararnged in a glass base 103. The glass base 103 supports an electrode system 105, which comprises an electron gun, shown only diagrammatically in FIG. 5. The cylindrical anode 106 of this system—which here replaces the wall electrode 8 of the tube shown in FIG. 1—may be provided with a miniature evaporation trough 107 formed by a folded sheet of tantalum, containing a few, for example 6 milligrams of silver. This trough is used to vapor-deposit an extremely thin layer of silver onto the target plate 91, if this is desired. In some cases, for example if an oxygen bombardment of the vapor-deposited target plate is carried out by means of a gas discharge in an oxygen atmosphere no silver layer is deposited on the target plate, although this is in principle not objectionable after such a bombardment.

The end of the duct 100 is surrounded by a spacious sheath 108, for example formed by a length of a cylindrical glass tube, which is held by means not shown, and is open at the top. The sheath surrounds the electrode system 105 and extends beyond it. On the lower side of the sheath 108 there is arranged a sleeve 109, for example of polyethylene, which is clamped around the duct 100, for example by means of a rubber ring 110.

Before the bulb 41 with the target plate 91, filled with a protective gas at atmospheric pressure was transferred from the duct 45 (FIG. 4) to the duct 100 (FIG. 5), the electrode system 105 was degassed. To this end an auxiliary bulb was disposed over this system, which bulb fitted over the top end of the duct 100 and may have the same shape as the bulb 41. This auxiliary bulb was then exhausted and the electrode system 105 subsequently degassed, for example by means of a furnace surrounding the auxiliary bulb, or by a high-frequency heating coil. Provision must be made, that if the evaporation trough 107 with silver is present, the heating thereof is not so strong that the silver will evaporate. After the degassification of the electrode system an inert protective gas, preferably a protective gas which can be gettered, for example nitrogen was passed through the duct 100 into the auxiliary bulb, while the pressure of this protective gas was continued, the auxiliary bulb used during the degassing process was lifted slightly from the end piece 101 of the duct 100—this may be facilitated by using a small excessive pressure of the protective gas—so that the protective gas flows slowly into the sheath 108 and supersedes the air contained therein for the major part. When the sheath was filled substantially completely with the protective gas, the auxiliary bulb was carefully removed in the upward direction and replaced by the bulb 41. To this end the bulb 41 was removed from the end of the duct 45 of the vapor-deposition pump system and transferred in upright position to the pump system having the electrode system 105, where the bulb 41 was slowly lowered over this system. If it is desired to apply a layer of silver to the target plate, the bulb 41 is exhausted as far as possible via the duct 100 and filled with oxygen at a pressure of 100 to $200 \times 10^{-5}$ mm. Hg. By inductive heating of the cylindrical electrode 106 at the area of the evaporation trough 107, the silver is evaporated and deposited through a metal gauze 111, closing the anode cylinder 106 at the upper end, onto the target plate 91. The window 42 of the bulb 41 is, if necessary, cooled, for example with the aid of a flow of air directed to this window. The quantity of silver in the trough 107 is proportioned so that a silver layer corresponding with the layer 20 of FIG. 2 is formed on the target plate 91; the thickness is about 100 A. The thickness of this layer must, at any rate, be so small that in the direction of its plane this layer exhibits substantially no electrical conductivity.

In the last stage on this pump system the bulb 41 was exhausted and then finished. The wall of the bulb 41 then was sealed to the upright rim of the glass base 103 in a conventional manner. The base 103 may be provided with an exhaust pipe having a spherical capillary, by means of which, on a further pump system any further treatment may be carried out, for example an activation of the getter in the bulb 41 and an optimum exhaustion for a longer time with simultaneous heating of the tube at, for example 100 to 150° C., while if desired the window can be cooled.

By means of the current conductors 102, which are electrically connected to the pins 104, after the exhaustion of the tube, the operation of the tube may be electrically checked, while furthermore in this state, for example, the cathode wire may be activated.

The protective gas used in the bulb 41 and in the sheath 108 before and during the transfer of the bulb 41 to the pump system comprising the electrode system 105 serves firstly for protecting the vapor-deposited target plate 91 from the atmosphere and secondly to prevent the degassed electrode system 105 from absorbing troublesome gases from the open air. While a rare gas, for example argon or helium may be employed it is preferable to use a protective gas such as nitrogen, any residues of which in the finished camera tube can be removed by gettering. It has been found that with the use of such a gas the lifetime of the tube may be longer than with the use of one of the rare gases. It is supposed that residues of the rare gases in the camera tube, since they are not removed by the conventional getters, produce ions during operations, which are likely to bombard the target plate, which thus loses oxygen. This loss of oxygen, particularly from the free surface of the target plate, may in the long run result in a rise in dark current.

It should be noted that the transfer of the bulb with the vapor-deposited target plate to a pump system having the electrode system (FIG. 5) while use is made of a protective gas, is given only as an example of a method of carrying out the invention. Instead of transferring the tube, the pump system where the vapor-deposition takes place, may be constructed so that the electrode system is arranged from the beginning in the same vacuum space as that used for the evaporation crucible, so that after the vapor-deposition process the evaporation crucible can be removed from the bulb 41 without interrupting the vacuum and the electrode system can be inserted instead. Such a method is described, for example, in British patent specification 853,070.

Furthermore, it should be noted that under certain conditions the use of a protective gas during the transfer of the tube from the pump system shown in FIG. 4 to the pump system of FIG. 5 can be omitted without harmful results. This may be the case, for example, if the surface of the photo-sensitive layer is subjected prior to the transfer to oxygen bombardment such that a large quantity of additional oxygen is absorbed in the surface of the layer.

The aforesaid method, as well as those described in the parent application can provide photo-sensitive camera tubes having an adequate low photo-conductive lag (in other words sufficiently high speed of response) for taking live scenes; hitherto this requirement has given rise to many difficulties with this type of pick-up tube. A further advantageous factor is that the maximum permissible dark current, which in practice is set at $5\times10^{-9}$ a., occurs only after at least a few hundred hours of operation. It has also been found that such camera tubes having a lifetime exceeding considerably that of the known camera tubes. This lifetime may even reach 1,000 or more hours.

As stated above, the incorporation of sulphur, selenium and/or tellurium in the photo-sensitive layer improves the spectral sensitivity to long-wave radiation, so that with hydrogen compounds of these elements in the gas atmosphere in the deposition process of a lead monoxide target plate, or the action of a gas atmosphere on a deposited target plate, camera tubes can be obtained which are very suitable for use in color television systems. This improvement in the spectral sensitivity to long-wave radiation is the more pronounced the more water vapor is replaced by hydrogen sulfide, seleniated hydrogen, tellurated hydrogen or a mixture thereof. The use of seleniated hydrogen or tellurated hydrogen instead of hydrogen sulfide provides a spectral sensitivity curve, which as compared with the curve obtained with hydrogen sulfide, exhibits a higher sensitivity to red light. By the choice of one of these gases (composition, relative and overall pressure) the spectral sensitivity curve of the camera tube manufactured by using such gas in accordance with the invention may be made to match to a greater or lesser extent given operational conditions. It should be noted that for use in television studios, both sensitivities to red and blue are desired, while for use in the red or infrared region, the sensitivity to blue is practically never required.

The following exemplary data may illustrate the present example. The photo-sensitive layer deposited as described earlier in a gas atmosphere containing oxygen and water vapor was exposed, prior to, or after, an oxygen bombardment by means of a gas discharge as described in that example, for 5 to 10 minutes to a gas atmosphere consisting mainly of hydrogen sulfide at a pressure of about 150 to $275\times10^{-5}$ mm. Hg. The window during this exposure was held at room temperature. A higher temperature may be used but at such higher temperature the duration of the exposure should be reduced. The gas atmosphere may contain, apart from the hydrogen sulfide, oxygen at a pressure of, for example about 50 to $100\times10^{-5}$ mm. Hg, but this is not necessary, if the exposure to the atmosphere of hydrogen sulfide is preceded by an oxygen bombardment, or if the layer is subjected to oxygen bombardment after the exposure so that the hydrogen sulfide atmosphere is more intensive. It always is advisable to perform an oxygen bombardment after the exposure to the hydrogen sulfide atmosphere in order to be quite sure that the surface of the layer has the desired p-type conductivity. Any presence of oxygen in the atmosphere containing the hydrogen sulfide may result in that a lower intensity of the last oxygen bombardment is sufficient. It should be noted that instead of hydrogen sulfide use may be made of seleniated or tellurated hydrogen or a mixture of these gases, in which case because of the greater activity of these gases a shorter duration of the exposure, a lower temperature of the window and/or a lower partial pressure of the hydrogen compound in the gas atmosphere is preferred.

Favorable results were obtained, when the aforesaid process was carried out with a photo-sensitive layer obtained by the vapor-deposition of lead monoxide in a gas atmosphere, the pressure of which was 1,000 to $1,500\times10^{-5}$ mm. Hg and which contained both oxygen and water vapor, to an extent such that their partial pressures had the ratio of 7:6; the water vapor pressure need not be reduced during the deposition process, which means that this ratio may be maintained throughout the deposition process.

By subjecting a photo-sensitive layer which in accordance with the invention consists of a lead monoxide and was either deposited in a gas atmosphere containing oxygen and water vapor or was exposed to such an atmosphere, in order of succession to an oxygen bombardment, to a treatment in a gas atmosphere as described above and then again to an oxygen bombardment, the layer can be given a composition which in going from the free surface in the direction of the support results in a p-i-(n)-(i)-p structure, in which the possible presence of the (n) and the (i) region results from a lower degree of compensation of the water absorbed in the last treatment in a gas atmosphere by the oxygen introduced into the surface by the oxygen bombardment. It will be obvious that by repeating the sequence of oxygen bombardment and exposure to such a gas atmosphere—in view of a desirable sensitivity to red-use is preferably made of hydrogen sulfide, seleniated or tellurated hydrogen, or a mixture thereof—although water-vapor may also be used—a multiple p-i-(n)-structure can be obtained, the thickness of the i-zone being each time fairly considerable, which involves a comparatively high sensitivity and a minimized photo-conductive lag.

It has been stated earlier that presumably one of the causes of the deterioration of a camera tube having a photo-sensitive target plate which consists mainly of a lead monoxide, in the course of its operation, resides in the loss of oxygen from the surface of the target plate scanned by the electron beam. This loss of oxygen may have different causes, for example; transfer of oxygen to the vacuum, since the pressure of the oxygen in the state of equilibrium at the surface is constantly reduced by the getter in the tube; the release of oxygen by impact of electrons; the reducing effect of ions or atoms of high thermal velocity produced by the electron beam in the tube; and photolysis of the photo-sensitive material due to the incident light on the layer in conjunction with the residual gases in the tube. Also the vacuum in the tube may contain n-forming elements which may adversely affect the desired p-type conductivity of the surface layer of the target plate. In order to reduce the effect of these factors, or to obviate them for the major part, it is desirable to protect the photo-sensitive layer from the vacuum. It has been found that this can indeed be realized and that in such way a further improvement in lifetime is obtained. According to this aspect of the invention, the photo-sensitive layer is provided on the side remote from the support with a thin layer of practically insulating or slightly p-type conducting material, which layer is denser (less porous) than the photo-sensitive layer proper. This protecting layer of which the thickness may be about $1\mu$, preferably consists also of lead monoxide and exhibits a glassy structure, such as is obtained by vapor-deposition upon a substratum having a comparatively low temperature.

Such a protecting layer of lead monoxide can be obtained by the vapor-deposition of a last layer of lead monoxide in an atmosphere containing substantially only oxygen, while the window is held at a low temperature below, for example 40° C. This protecting layer may be vapor-deposited in addition after the photo-sensitive layer proper has been deposited and treated as described above, with the exception, however, of the vapor-deposition of an extremely thin layer of silver or other suitable metal, which does not exhibit transverse conductivity. It is also possible to form this layer during the vapor-deposition, or upon the completion of the vapor-deposition of the photo-sensitive layer itself by reducing the temperature of the support to below about 40° C. during the vapor-deposition of the last part of the layer. When the distinctly p-type conducting surface layer of the target plate is obtained by the vapor-deposition of lead monoxide doped with a small quantity of thallium of other suitable p-forming element the resulting doped surface layer itself may operate as a protecting layer, if during the deposition of said doped surface layer the window is held at the aforesaid lower temperature. If, furthermore, an extremely thin metal layer, not exhibiting transverse conductivity, is desired on the target plate, this may be vapor-deposited on the protecting layer. The protecting layer may consist, not only of lead monoxide but also of a suitable insulating material, for example silicon monoxide (SiO), which must be sufficiently thin to allow electrons or holes to pass through.

As an alternative, a photo-sensitive material other than lead monoxide may be used for the protecting layer, to the extent that this material can be vapor-deposited in the form of a substantially non-porous layer. For example, a thin layer of antimony trisulphide ($Sb_2S_3$) or selenium (Se) may be vapor-deposited by an additional process on a target plate deposited and treated. Such target plate, however, must not be provided with an extremely thin silver layer on its surface.

In the foregoing, the invention has been described with reference to examples referring to camera tubes of the vidicon type, having a photo-sensitive, in fact photo-conductive, target plate consisting mainly of lead monoxide. It should be noted that the invention is not restricted to camera tubes of the said kind.

Thus, FIGS. 6 and 7 illustrate an embodiment of a photo-conductive cell provided with linear electrodes. It should be noted that for the sake of clarity, various dimensions are not shown in the correct ratio. For dimensions which are of interest possible practical values are given below.

The cell illustrated with FIG. 6 which shows a part of a transverse section of this cell, comprises a plate-shaped support 200 of glass, one side of which is provided with alternating parallel extending straight electrodes 202 and 203. The electrodes 202, which are electrically interconnected, may consist of conductive tin oxide or vapor-deposited silver and have a width of about 20$\mu$. The electrodes 203, which are also electrically interconnected and have the same width as the electrodes 202, consist of nickel or platinum vapor-deposited on the support 20 to a thickness of about 20$\mu$. The distance between the centers of consecutive electrodes (202, 203) is about 500$\mu$, but may be much larger, for example 1,000$\mu$. Over each pair of adjacent electrodes 202 and 203 there extends a path 204 of photo-conductive material, following the direction of these electrodes and obtained by vapor-deposition, while consecutive paths are separated by a non-covered surface strip 207 of the support 200. In operation of the photo-conductive cell, the electrodes 202 should be positively biased with respect to the electrodes 203 whereby the electrodes constitute the positive current supply members and the electrodes 203 the negative supply members to the photo-conductive material.

In accordance with the invention, the paths 204, each having a thickness of about 10 to 30$\mu$, mainly consist of lead monoxide having portions which are n-type or p-type conductive (and hence also intrinsically conductive). During the vapor-deposition process, or during a thermal treatment preceding one or more final stages of the manufacture of the paths, one of the aforesaid gases i.e., water-vapor and/or hydrogen sulfide, seleniated or tellurated hydrogen and an excess quantity of oxygen compensating at least the effect of said gas on the electrical properties of the photo-conductive material are incorporated therein. By far, the major part of each path, i.e., a longitudinal strip 205 which extends, in its transverse direction, from across the electrode 202 to the proximity of the electrode 203 consists of material having substantially intrinsic conductivity or slight p-type conductivity since the gas absorbed there is, at least, compensated, but not distinctly over-compensated by additionally absorbed oxygen. The remaining portion 206 of a path 204, contacting the electrode 203, has, however, distinctly p-type conductivity, at least as far as the photo-sensitive material covering the electrode 203 is concerned. The paths 204 are located in a hermetically closed space limited by the support 200 and a cup-shaped lid 201, bearing thereon and connected with the rim thereof, which lid may be made of glass, or instead thereof of suitable ceramic material, or a metal (for example aluminum). The closed space comprising the paths 204 may be exhausted, but it is advantageous to provide an oxygen atmosphere at a pressure of about 10 to $100\times10^{-5}$ mm. Hg.

The p-type conducting portion 206 of the photo-conducting path 204, covering the electrode 203, may be obtained by a method similar to that used for obtaining a p-type conducting surface layer on a target plate of a camera tube, while prior or subsequent thereto the larger, intrinsic conducting portion 205, covering the electrode 202, may be obtained by the method used in the manufacture of such a tube.

FIG. 7 illustrates a method in which the portion 206 was vapor-deposited last, while the portion 205 of the paths 204, which covers the electrode 202 and extends closely to the electrode 203, was gradually vapor-deposited starting from an electrode 203, use being made of a mask 210, which was moveable during the vapor-deposition process. This mask was provided with parallel narrow slots 211, which are parallel to the electrodes 202 and 203, the distance between these slots being equal to the distance between the electrodes 202. The slots 211 may have a width of 50 to 100$\mu$ and may be etched in the plate 210, preferably so that their section tapers towards that side of the plate 210 which faces the support 200, when the mask is in use. The support 200 was used with the electrodes 202 and 203 on the inner side, as a closure-member of an evaporation vessel comprising a holder with the lead monoxide to be deposited on the support. The evaporation vessel and the holder are not shown in FIG. 7 for the sake of simplicity. Closely in front of the support 200 and between this support and the holder mask 210 was arranged so as to be moveable so that it could be moved slowly and uniformly parallel to the support and at right angles to the direction of the electrodes 202 and 203. At the beginning of the vapor-deposition of the lead monoxide (the direction of the vapor is indicated in FIG. 7 by the arrows D) the place of the mask 210 was such that the slots 211 were located substantially opposite the electrodes 202 or (as shown in FIG. 7) slightly on the lefthand side thereof. During the vapor-deposition of the lead monoxide on the support 200, which latter could be cooled by means of a coolant 212 on the outer upper side, the mask 210 was moved slowly and uniformly in the direction indicated in FIG. 7 by the arrow B, so that a path 205 of uniform thickness was formed on the electrode 202 and adjacent thereto, this path extending transversely almost up to the first-following electrode 203 as viewed in the direction of movement of the mask 211. The vapor-deposition process was carried out either in a gas atmosphere containing oxygen and a gas such as water-vapor, hydrogen sulfide, seleniated and/or tellurated hydrogen, the partial pressure of the gas being reduced during the process, or in an atmosphere containing substantially only oxygen. After the portions 205 of the paths 204 had thus been deposited, the remaining portions 206 were deposited, in which step the mask 210 was moved onwards in the direction B so that these portions 206 covered the electrodes 203. The vapor-deposition in oxygen and one of the aforesaid gases of the portions 206 can be performed following the deposition of the portions 205, or the deposited portions 205 can be first treated in an atmosphere containing, in addition to oxygen, one of the aforesaid gases after which the portions 206 can be vapor-deposited.

Therefore, while we have described the invention with reference to particular applications and embodiments thereof, other modifications will be apparent to those skilled in the art without departing from the spirit and scope of the invention as defined in the appended claims.

What is claimed is:

1. A photo-responsive device comprising a photo-sensitive layer of PbO on a support, positive and negative current supply means respectively to said layer defining a direction of current flow through the layer, the part of said layer between said positive and negative current supply means comprising a major portion exhibiting substantially intrinsic conductivity and extending at least 4$\mu$ in length in the direction of current flow in the layer whereby upon a voltage of the order of 10 to 100 volts applied between said supply means in the dark a major portion of said applied voltage appears across said major portion of said layer, the electric field strength in said major portion then being substantially constant, and another portion of said layer adjoining said major portion and said negative current supply means, said other portion having a length in the direction of current flow substantially less than that of said major portion and exhibiting p-type conductivity whereby said latter portion serves as a barrier impeding the flow of electrons from said negative current supply means to said major portion.

2. A photo-responsive device as claimed in claim 1 in which the PbO layer has a further portion between the major portion and the positive current supply means exhibiting n-type conductivity and having a length in the direction of current flow substantially less than that of said major portion whereby said further portion serves as a barrier impeding the flow of positive charges from said positive current supply means to said major portion.

3. A photo-responsive device as claimed in claim 1 in which the major portion contains an amount of oxygen in excess of stoichiometry and water.

4. A photo-responsive device as claimed in claim 2 in which the major portion contains an amount of oxygen in excess of stoichiometry and water.

5. A photo-responsive device as claimed in claim 3 in which the layer of p-type conductivity contains an amount of oxygen in excess of stoichiometry.

6. A photo-responsive device as claimed in claim 4 in which the layer of p-type conductivity contains an amount of oxygen in excess of stoichiometry.

7. A photo-responsive device as claimed in claim 3 in which the PbO layer contains a quantity of an element selected from the group consisting of sulfur, selenium and tellurium.

8. A photo-responsive device as claimed in claim 4 in which the PbO layer contains a quantity of an element selected from the group consisting of sulfur, selenium and tellurium.

9. A camera tube comprising an envelope having a transparent window portion, a layer of photo-sensitive PbO disposed within the tube to receive an image transmitted through said window, a positive terminal connection to said layer on the side thereof facing said window, electron beam-forming means on the side layer remote from said window constituting a negative terminal connection to the layer, said layer having a major portion exhibiting substantially intrinsic conductivity and extending at least 4$\mu$ in the direction of thickness whereby upon a voltage of the order of 10 to 100 volts applied across said terminal connections in the dark a major portion of said applied voltage appears across said major portion of said layer, the electric field strength in said major portion then being substantially constant, and another portion of said layer facing said electron beam-forming means, said other portion having a thickness substantially less than that of said major portion and exhibiting p-type conductivity whereby said other portion serves as a barrier impeding the flow of electrons from the surface facing said electron beam-forming means to said major portion.

10. A camera tube as claimed in claim 9 in which the PbO layer has a further portion adjoining said positive terminal connection having a thickness which is substantially less than that of said major portion and which exhibits n-type conductivity whereby said further portion serves as a barrier impeding the flow of positive charges from said positive terminal connection to said major portion.

11. A camera tube comprising an envelope having a transparent window portion, a layer of photo-sensitive PbO disposed within the tube to receive an image transmitted through said window, a positive terminal connection to said layer on the side thereof facing said window, electron beam-forming means on the side of said layer remote from said window constituting a negative terminal connection to the layer, said layer having a major portion exhibiting substantially intrinsic conductivity by containing an amount of oxygen in excess of stoichiometry and water whereby upon a voltage of the order of 10 to 100 volts applied across said terminal connections in the dark a major portion of said applied voltage appears across said major portion of said layer, the electric field strength in said major portion then being substantially constant, and another portion of said layer facing said electron beam-forming means, said other portion having a thickness substantially less than that of said major portion and exhibiting p-type conductivity whereby said other portion serves as a barrier impeding the flow of electrons from the surface facing said electron beam-forming means to said major portion.

12. A camera tube as claimed in claim 11 in which the PbO layer has a further portion adjoining said positive terminal connection having a thickness which is substantially less than that of said major portion and which exhibits n-type conductivity whereby said further portion serves as a barrier impeding the flow of positive charges from said positive terminal connection to said major portion.

13. A camera tube as claimed in claim 11 in which the portion of the PbO layer of p-type conductivity contains an amount of oxygen in excess of stoichiometry.

14. A camera tube as claimed in claim 13 in which the PbO layer has a further portion adjoining said positive terminal connection having a thickness which is substantially less than that of said major portion and which exhibits n-type conductivity whereby said further portion serves as a barrier impeding the flow of positive charges from said positive terminal connection to said major portion.

15. A camera tube as claimed in claim 11 in which the portion of the PbO layer of p-type conductivity contains thallium.

16. A camera tube as claimed in claim 11 in which the PbO layer contains an element selected from the group consisting of sulfur, selenium, and tellurium.

17. A camera tube as claimed in claim 16 in which the PbO layer has a further portion adjoining said positive terminal connection having a thickness which is substantially less than that of said major portion and which exhibits n-type conductivity whereby said further portion serves as a barrier impeding the flow of positive charges from said positive terminal connection to said major portion.

18. A camera tube as claimed in claim 12 in which a non-porous protective layer is provided covering the PbO layer on the side thereof facing the electron beam-forming means.

19. A camera tube as claimed in claim 18 in which the protective layer is PbO.

20. A camera tube as claimed in claim 18 in which the protective layer is photo-conductive.

21. A camera tube as claimed in claim 11 in which the layer has a thickness of about 5–200$\mu$.

22. A camera tube as claimed in claim 21 in which the PbO layer has a further portion adjoining said positive terminal connection having a thickness which is substantially less than that of said major portion and which exhibits n-type conductivity whereby said further portion serves as a barrier impeding the flow of positive charges from said positive terminal connection to said major portion.

23. A camera tube as claimed in claim 13 in which the thickness of the portion of p-type conductivity is between 10 and 200 A.

24. A camera tube as claimed in claim 14 in which the thickness of the portion of p-type conductivity is between 10 and 200 A.

25. A camera tube as claimed in claim 9 in which the positive terminal connection to the layer is constituted by a transparent conductive tin oxide coating on a glass-substrate, the electric contact between the layer and said coating serving as a barrier impeding flow of positive charges from said coating to said major portion.

26. A camera tube as claimed in claim 11 in which the positive terminal connection to the layer is constituted by a transparent conductive tin oxide coating on a glass-substrate, the electric contact between the layer and said coating serving as a barrier impeding flow of positive charges from said coating to said major portion.

27. A camera tube as claimed in claim 13 in which the positive terminal connection to the layer is constituted by a transparent conductive tin oxide coating on a glass-substrate, the electric contact between the layer and said coating serving as a barrier impeding flow of positive charges from said coating to said major portion.

28. A camera tube as claimed in claim 16, in which the positive terminal connection to the layer is constituted by a transparent conductive tin oxide coating on a glass-substrate, the electric contact between the layer and said coating serving as a barrier impeding flow of positive charges from said coating to said major portion.

References Cited

UNITED STATES PATENTS 2,890,359 6/1959 Heijne et al. ---------- 313—65

JAMES W. LAWRENCE, *Primary Examiner.*

V. LAFRANCHI, *Assistant Examiner.*

U.S. Cl. X.R.

117—200; 313—94; 317—238; 338—15

UNITED STATES PATENT OFFICE
CERTIFICATE OF CORRECTION

Patent No. 3,444,412 May 13, 1969

Edward Fokko de Haan et al.

It is certified that error appears in the above identified patent and that said Letters Patent are hereby corrected as shown below:

In the heading to the printed specification, after line 7, insert -- assignors, by mesne assignments, to U. S. Philips Corporation, New York, N. Y., a corporation of Delaware --.

Signed and sealed this 2nd day of June 1970.

(SEAL)
Attest:

Edward M. Fletcher, Jr.
Attesting Officer

WILLIAM E. SCHUYLER, JR.
Commissioner of Patents